R. C. HOFFMAN.
DISK WHEEL CONSTRUCTION.
APPLICATION FILED JAN. 19, 1920.
1,358,850. Patented Nov. 16, 1920.
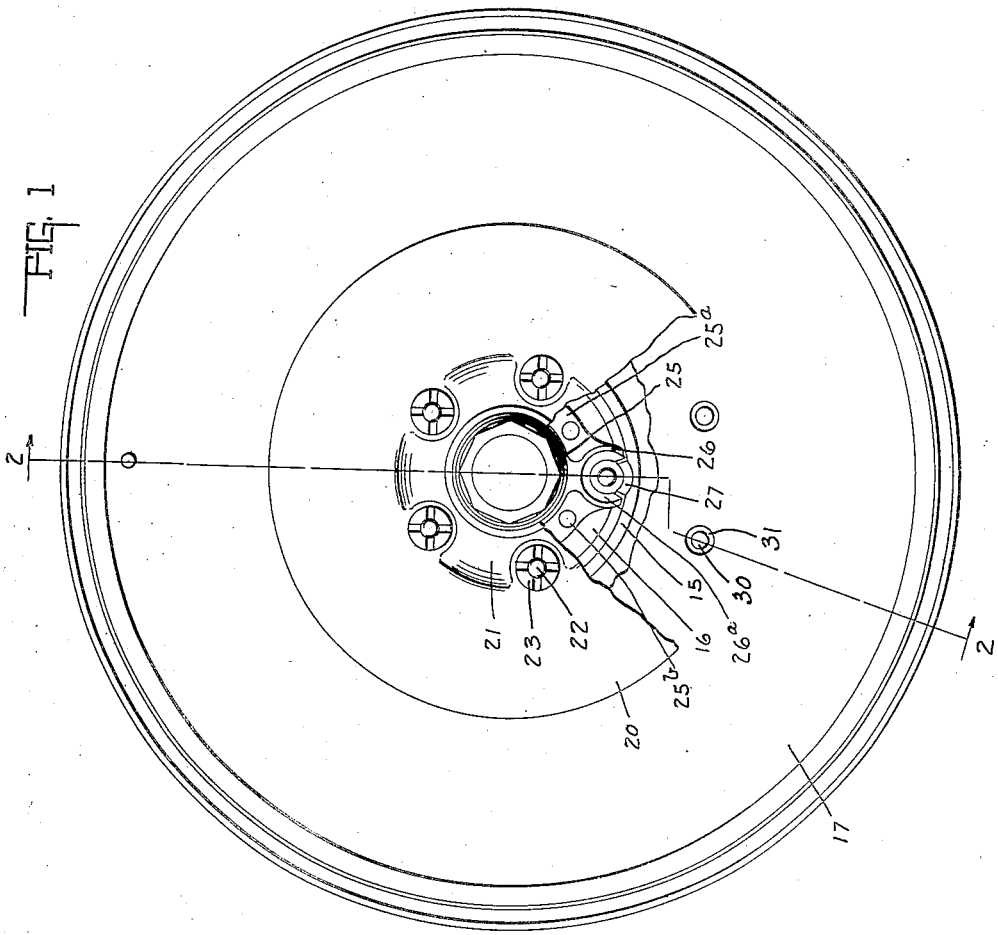
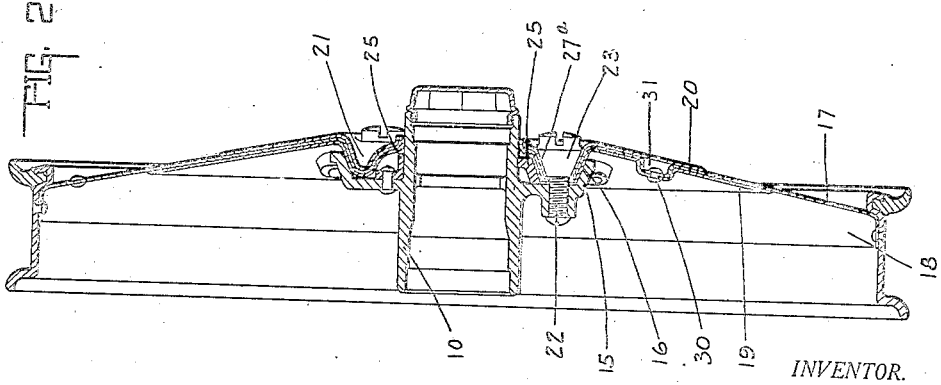
INVENTOR.
ROSCOE C. HOFFMAN.
BY
*Lockwood & Lockwood*
ATTORNEYS.

UNITED STATES PATENT OFFICE.

ROSCOE C. HOFFMAN, OF INDIANAPOLIS, INDIANA.

DISK-WHEEL CONSTRUCTION.

1,358,850.

Specification of Letters Patent. Patented Nov. 16, 1920.

Application filed January 19, 1920. Serial No. 352,453.

*To all whom it may concern:*

Be it known that I, ROSCOE C. HOFFMAN, a citizen of the United States, and a resident of Indianapolis, county of Marion, and State of Indiana, have invented a certain new and useful Disk-Wheel Construction; and I do hereby declare that the following is a full, clear, and exact description thereof, reference being had to the accompanying drawings, in which like numerals refer to like parts.

This invention relates to a disk-wheel for vehicles, and particularly to the hub mounting and construction thereof, reference being had to my former applications Serial No. 320,773 and No. 330,063.

The principal feature of this invention is the method of securing the laminated disks together, and securing the disk to the hub so as to prevent any danger of their shearing off by relieving them of any local strain or stress. This is accomplished by means of a collar adapted to be mounted upon the hub and provided with a plurality of radial yokes having tapered circular recesses in which the shouldered nuts for securing the parts together are embedded. The collar is riveted or spot welded to the hub thereby eliminating the necessity of forming the hub in one piece as described in my former application, and greatly simplifying the manufacturing methods heretofore employed.

The full nature of the invention will be understood from the accompanying drawings and the following description and claims:—

Figure 1 is a front elevation of the wheel and hub with the hub cap removed and a portion broken away to show other parts in detail. Fig. 2 is a cross sectional view taken on the line 2—2 of Fig. 1.

In the drawings there is shown a vehicle wheel having a hub 10 provided with an outwardly extending flange 15 having an upwardly extending annular beveled rim 16, in which the disk-wheel is secured.

The disk-wheel is composed of a sheet metal disk 17 provided on its outer edge with an inwardly turned rim carrying flange 18 yieldingly reinforced by the spring disks 19 and 20 positioned upon opposite sides of said disk. The inner edge of the disk wheel is provided with an inwardly extending annular groove 21, corresponding to the flange 15 and beveled rim 16 so that the outer surface of the groove 21 may bear against the inner surface of the rim 16, as shown in Fig. 2.

The hub collar 25 is adapted to fit snugly about the hub 10 and has a radial flange portion 25ª adapted to be rigidly secured to the hub flange 15 by the rivets 25ᵇ, or any other suitable means. At intervals about the periphery of the collar there are formed up from the same axially projecting bosses 26 in the form of a yoke with encircling fingers forming within the same a partially inclosing conical surface or tapered seat 26ª. The conical flange 16 of the hub is cut away to form a tapered bearing portion adjacent the yoke 26, said tapered portion 26ª and portion 27 forming an encircling tapered seat.

Herein the rivets 25ᵇ are shown positioned around said flange 25 midway between the several axially extending yoke members 26. At corresponding intervals adjacent the tapered seat and above the same, the annular flange 21 of the disk wheel is provided with conical depressions 27ª formed so as to make a snug fit with the tapered conical seat. Extending forwardly of the flange 10 and suitably secured therein are a plurality of bolts 22 positioned centrally of the conical seat and adjacent the conical depression 27ª, said bolts extending through the same. Upon the other ends of said bolts there are secured the nuts 23, the same provided with tapered sides which are snugly seated in the conical seat and depressions when the nuts are tightened to secure the disks to the hub. The inner edges of the disk 17 and the reinforcing spring disks 19 and 20 are welded together at the edges of the conical depressions and at their inner circular edges so as to secure them firmly in their relative relation to each other at their inner edges.

Spaced at intervals around the wheel, preferably between the bolts 22, there are rivets 30 securing the disks 17 and 19 together, said rivets being sunk in the depressions 31 stamped in said disks. Said depressions are formed so as to register with each other and aid in locking said disks against relative rotation. The rivets and depressions are located between the exterior periphery of the disk 20 and the hub 10 so as to be covered and protected by the former, and being near the fixed inner portion of the wheel, this securing means will tend to further strengthen the wheel, securing said disks more firmly to each other.

This construction, therefore, eliminates the tendency to shear between the laminations of the disk wheel and transmits the axle torque to a point farther out than the hub, and over a greater distance since the hub is suspended from and supported by and upon the top portion of the annular conical flange 21. The arrangement of the collar also obtains a greater bearing surface on the driving surface than can ordinarily be obtained in the use of thin disks of metal of which the disks are formed.

The invention claimed is:

1. A disk wheel and hub construction including a hub member having an annular flange about the periphery thereof, outwardly beveled bearing surfaces about the periphery of said flange, an annular collar adapted to be secured to said flange, axially projecting yokes on said collar having encircling fingers forming a partially inclosing conical seat, a disk wheel mounted on said hub, an annular flange in said disk wheel adapted to be secured between said first mentioned flange and said collar and provided with conical depressions to be positioned in said conical seats, and a tapered nut positioned so as to secure and lock said depressions about said hub flange, whereby a greater bearing surface may be obtained for the support and driving of said disk wheel.

2. The combination with a vehicle hub of a disk wheel including a plurality of disks, means for securing said disks to said hub, two of said disks being provided with embedding depressed portions spaced about said hub, and means for securing said depressed portions together for preventing any shear between said disks and causing said secured disks to share the axle torque at a distance from the hub, and distributing the driving stress over a greater area.

In witness whereof I have hereunto affixed my signature.

ROSCOE C. HOFFMAN.